Apr. 3, 1923.
W. E. WHITE
1,450,532
AUTOMOBILE FENDER ATTACHMENT
Filed Aug. 10, 1922
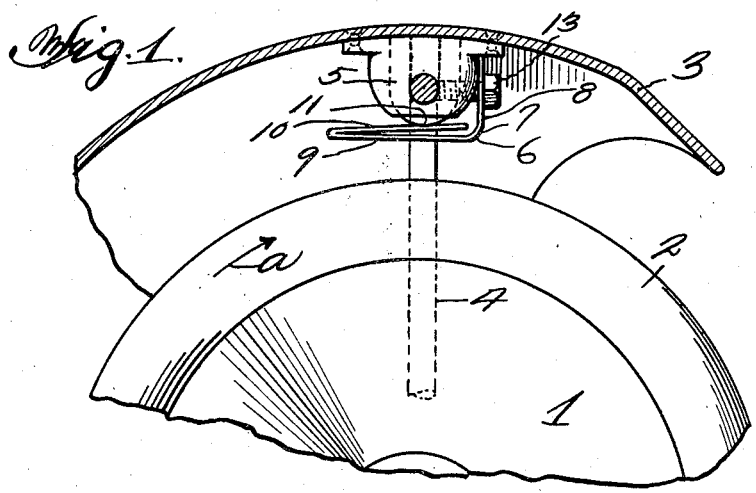
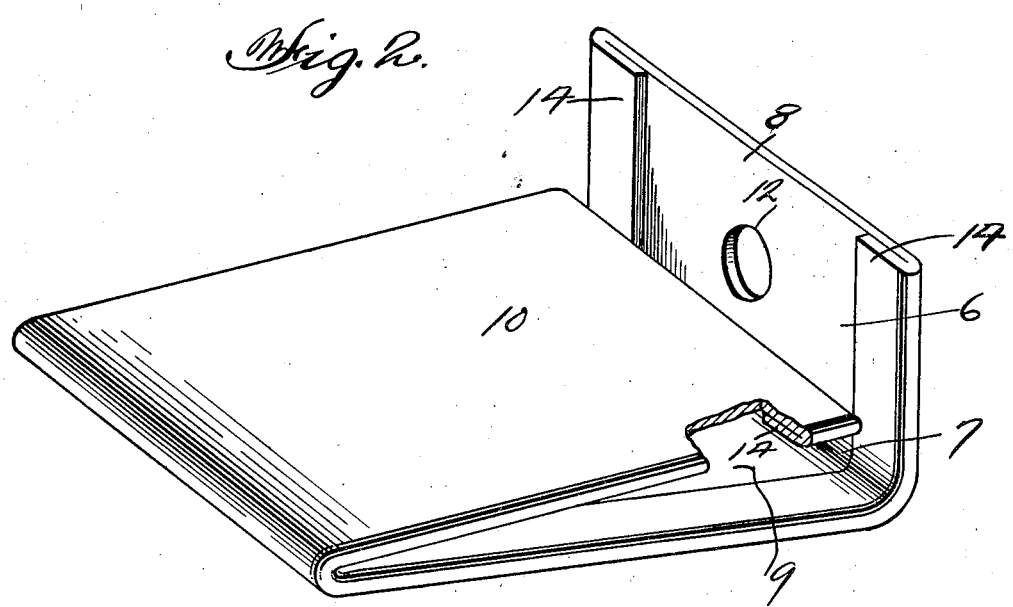
Inventor
W. E. White
D. Swift
Attorney Patented Apr. 3, 1923.

1,450,532

UNITED STATES PATENT OFFICE.

WILLIAM E. WHITE, OF CITRONELLE, ALABAMA.

AUTOMOBILE FENDER ATTACHMENT.

Application filed August 10, 1922. Serial No. 580,925.

*To all whom it may concern:*

Be it known that I, WILLIAM E. WHITE, a citizen of the United States, residing at Citronelle, in the county of Mobile, State of Alabama, have invented a new and useful Automobile Fender Attachment; and I do hereby declare the following to be a full, clear, and exact description of the invention, such as will enable others skilled in the art to which it appertains to make and use the same.

The invention relates to automobile fender attachments and has for its object to provide an angular shaped member detachably attached to a fender iron and disposed between the fender iron and the pneumatic tire and forming means whereby upon excessive movement of the tire and fender towards each other the tire will be prevented from coming into engagement with the fender iron, and protected in such a way that the tire casing will not be injured.

A further object is to provide a tire casing protector adapted to be detachably attached to a fender iron located above the tire, said protector being formed from spring material and disposed between the tire casing and the fender iron. Also to form the protector from a single piece of metal bent upon itself to form a right angle member having an inwardly and upwardly extending fender iron engaging spring member.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of an automobile wheel and tire, showing the fender in longitudinal vertical section and the protector applied to the fender iron.

Figure 2 is a perspective view of the protector.

Referring to the drawing, the numeral 1 designates a conventional form of automobile wheel and 2 the tire carried thereby. Disposed above the tire 2 is a fender 3, which fender is supported by a bracket 4, which extends through a conventional form of fender iron 5. At the present time during excessive flexing of the automobile springs, for instance when the wheels go into holes in the roadway, the fender iron 5 moves downwardly to such an extent that it engages the tire 2 and ruins the casing thereof. To obviate this difficulty the protector 6 is provided. The protector 6 is formed from a single piece of material bent at 7 to form the vertical flange 8 and the horizontal flange 9, which horizontal flange 9 is disposed beneath the fender iron 5 and spaced therefrom. The flange 9 terminates in an upwardly and inwardly extending spring member 10 which engages the under side 11 of the fender iron in such a manner that when the wheel 1 and the fender 2 moves towards each other, the tire 2 will engage the flange 9 and slide thereon without damage to the tire. The flange 8 is provided with an aperture 12 for the reception of the securing bolt 13, which is threaded into the fender iron 5 in such a manner that the spring member 10 is held in close engagement with the under side 16 of the fender iron 5. It will be seen that during the rotation of the wheel 1 in the direction of the arrow *a* that upon a downward movement of the fender iron 5, the flange 9 of the protector will come into engagement with the tire 2 and that said tire will slide thereover and will not be damaged. The marginal edges of the flanges 6 and 9 and the member 10 are preferably reinforced by integral overlapping flanges 14.

From the above it will be seen that a tire protector is provided which is simple in construction, the parts formed from a single piece of metal and so constructed that it may be easily and quickly applied to fender irons of automobile fenders of conventional forms.

The invention having been set forth what is claimed as new and useful is:—

The combination with an automobile fender having a fender iron on the under side thereof, said iron being disposed above an automobile tire carried by a wheel, of a protector for said tire, said protector comprising an angularly shaped member formed from a single piece of material, one flange of said angularly shaped member being substantially vertically disposed and secured to the fender iron at one side thereof, the other flange of said member being spaced from and underlying the fender iron and substantially horizontally disposed and an upwardly and inwardly extending member carried by the outer end of the horizontally disposed flange and engaging the underside of the fender iron, said protector being formed from spring material.

In testimony whereof I have signed my name to this specification in the presence of two subscribing witnesses.

WILLIAM E. WHITE.

Witnesses:
C. W. Thomas,
Jas. S. Lynch.